United States Patent [19]

Kade et al.

[11] Patent Number: 4,509,611
[45] Date of Patent: Apr. 9, 1985

[54] ADAPTIVE CONTROLLER FOR ELECTRIC POWER STEERING

[75] Inventors: Alexander Kade, Detroit; Sam M. Karadsheh, Troy, both of Mich.

[73] Assignee: General Motors Corporation, Detroit, Mich.

[21] Appl. No.: 541,781

[22] Filed: Oct. 13, 1983

[51] Int. Cl.³ .............................................. B62D 5/04
[52] U.S. Cl. .................................. 180/79.1; 180/142
[58] Field of Search ...................... 180/79.1, 140, 141, 180/142

[56] References Cited

U.S. PATENT DOCUMENTS 3,866,706  2/1975  Lincke et al. ...................... 180/142
4,377,759  3/1983  Ohhata et al. ...................... 307/491
4,437,532  3/1984  Nakamura et al. ................ 180/142

FOREIGN PATENT DOCUMENTS 47963  4/1980  Japan ................................. 180/141
 8467  1/1983  Japan ................................ 180/79.1

Primary Examiner—Joseph F. Peters, Jr.
Assistant Examiner—Mitchell J. Hill
Attorney, Agent, or Firm—Mark A. Navarre

[57] ABSTRACT

A torque transducer senses the operator exerted steering torque and provides an output signal which varies in magnitude from a low value representative of a large operator exerted steering torque in one direction through a mean value representative of no operator exerted steering torque to an upper limit value representative of a large operator exerted steering torque in the opposite direction. The controller develops a zero torque reference which has an initial value substantially corresponding to the mean value of the torque transducer output signal, and steering torque assist is developed in relation to the difference between the zero torque reference and the transducer output signal. In operation, the zero torque reference is shifted according to a predetermined time response characteristic in a direction to reduce the difference between it and the transducer output signal. Over a period of time, the shifting of the zero torque difference due to operator exerted steering torque tends to cancel out and the remaining shifting adaptively compensates the zero torque reference for drift and other like sources of error affecting the magnitude of the transducer output signal.

9 Claims, 5 Drawing Figures

ADAPTIVE CONTROLLER FOR ELECTRIC POWER STEERING

This invention relates to motor vehicle electric power steering and more particularly to an adaptive control system for producing an electrical signal representative of the steering torque exerted on the steering wheel by the operator of the vehicle.

An electric power steering system of the type envisioned by this invention generally includes a torque transducer for sensing the force or torque exerted on the steering wheel by the operator of the vehicle, a motor connected to the steering linkage for providing a steering assist force or torque, and a controller for energizing the motor to provide a steering torque assist in relation to the output of the torque transducer. Although several different types of torque transducers may be used, it can generally be said that the output of the torque transducer varies in magnitude from a lower limit value representative of a large operator exerted steering torque in one direction (a left hand steering maneuver, for example), through a mean value representative of no operator exerted steering torque to an upper limit value representative of a large operator exerted steering torque in the opposite direction (a right hand steering maneuver, for example).

Ideally, the steering controller and motor function to produce a steering assist torque in direct relation to the amount by which the transducer output signal deviates from the mean value. In practice, however, the transducer is not ideal and a dead zone is typically defined about the mean value so that minor deviations of the transducer output signal from the mean value caused by transducer miscalibration, drift and wear are not recognized by the controller as driver exerted steering torque. Steering assist torque is only produced when the transducer output signal is driven outside the dead zone. Depending on the transducer characteristics, the dead zone may have to be relatively wide to prevent the production of unwanted steering assist torque, and to such extent, the steering response for low levels of driver exerted steering torque is degraded, resulting in less than ideal on-center steering feel. Put another way, the dead zone by definition reduces the range of torque values recognized by the control system and therefore reduces the range of control that would otherwise be available.

Accordingly, it is an object of this invention to provide an improved controller for an electric power steering system which incorporates a torque transducer for sensing the operator exerted steering torque, wherein the controller is responsive to the transducer output and provides an accurate indication of the operator exerted steering torque without the use of a dead zone.

It is a further object of this invention to provide an improved controller for an electric power steering system of the above type wherein drift and other like sources of error which affect the transducer output are adaptively compensated for.

It is a further, more specific object of this invention to provide an improved controller of the above type wherein a zero torque reference nominally representative of no operator exerted steering torque is shifted according to a predetermined time response characteristic in a direction to reduce the difference between it and the transducer output value.

It is a further object of this invention to provide an improved controller of the above type wherein shifting of the zero torque reference is inhibited when the deviation between it and the transducer output value is so great that it is likely not attributable to drift or the other like sources of error which affect the transducer output.

It is a still further object of this invention to provide an improved controller of the above type wherein a steady state error term is developed during vehicle operation and used to initialize the zero torque reference in subsequent vehicle operation.

These objects are carried forth by establishing a zero torque reference (ZTR) having an initial value which corresponds to the mean or nominal no torque value of the torque transducer output signal. As set forth above, the motor control signal and hence the amount of torque assist is developed in relation to the difference between the zero torque reference (ZTR) and the transducer output signal As the system is operated, the zero torque reference is shifted in accordance with a predetermined time response characteristic in a direction to reduce the difference between it and the transducer output signal whenever such difference is less than a reference difference so great that it is likely attributable to operator exerted steering torque rather than to drift or other like sources of error which affect the value of the torque transducer output signal. Low level operator exerted steering torque produces a difference which is indistinguishable from that produced by drift and the other like sources of error, but over a period of operation, shifting of the zero torque reference due to such operator exerted steering torque tends to cancel out. The remaining net shifting adaptively compensates the zero torque reference for drift and other like sources of error which affect the magnitude of the transducer output signal. As a result, the value of zero torque reference more nearly corresponds to the actual value of the transducer output signal for which no steering torque is exerted by the operator of the vehicle.

According to another aspect of this invention, a steady state error term (SSET) is developed by a relatively long time constant integrator and is stored in nonvolatile memory. In subsequent vehicle operation, the stored steady state error term is used to initialize the value of the zero torque reference. As a result, the shifting amount required to compensate for steady state or long term errors (such as misalignment of the torque sensor), which amount is "learned" by the adaptive controller during vehicle operation, is retained and need not be "relearned" in subsequent periods of vehicle operation.

Shifting of the zero torque reference due to operator exerted steering torque (as opposed to shifting due to drift or other like sources of error) yields a further and unexpected steering response characteristic which may be helpful in evasive driving maneuvers. Since the amount of torque assist is developed in relation to the difference between the zero torque reference and the torque transducer output signal, shifting of the zero torque reference due to an operator exerted steering torque in one direction tends to reduce the amount of steering torque assist provided by the control system. When the operator exerted steering torque is suddenly reversed, as is often the case in evasive maneuvering, the difference between the torque output signal and zero torque reference, and hence the amount of torque assist provided by the system, is greater than it would be without the shifting. Thus, in evasive maneuvering which requires a sharp steering maneuver in one direction followed by a sharp steering maneuver in the opposite direction, the amount of torque assist provided by the electric power steering system is increased. This feature is also helpful under normal driving conditions in that the steering returnability is improved.

IN THE DRAWINGS

FIG. 1 schematically depicts an electric power steering system and a controller therefor.

Figure 1:
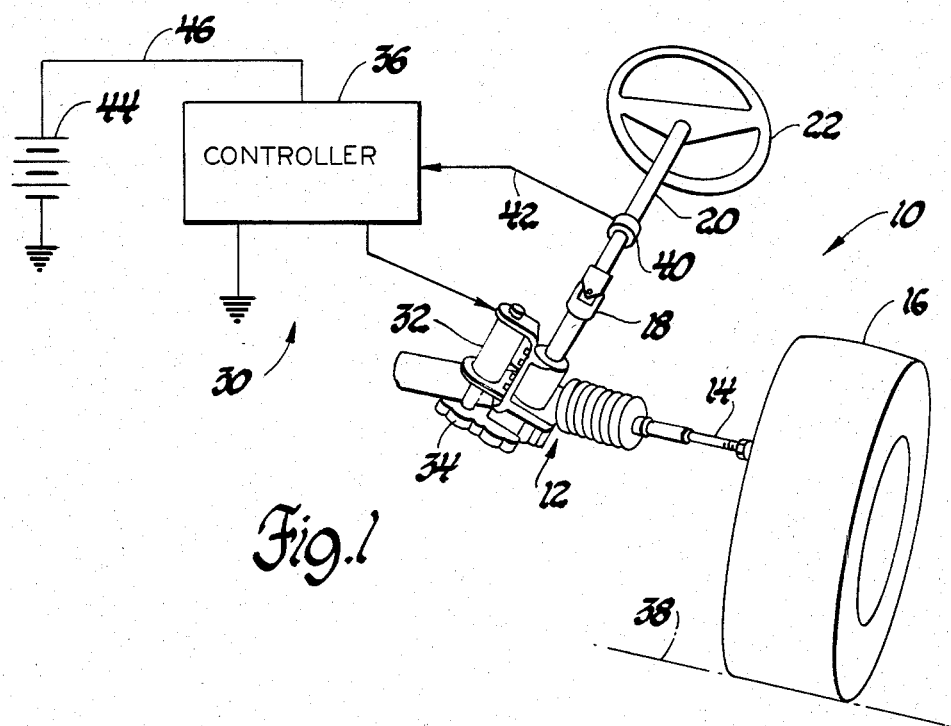

Referring now more particularly to FIG. 1, reference numeral 10 generally designates a motor vehicle power steering system of the type envisioned by this invention. The steering mechanism, which is designated by the reference numeral 12, is of the rack-and-pinion type and consists essentially of a toothed rack (not shown) and a pinion gear (also not shown) in engagement therewith. Each end of the rack is connected to a steering tie-rod 14 which, in turn, is connected to the steering knuckles (not shown) of a respective dirigible vehicle wheel 16, such that lateral movement of the rack and tie-rod 14 operates to steer the vehicle wheels 16 in unison. The pinion gear is connected through a universal joint 18 and steering column 20 to an operator manipulated steering wheel 22 so that the vehicle operator may rotate the pinion gear and thereby steer the vehicle wheel 16 by rotating the steering wheel 22.

An electric power steering torque assist mechanism is designated generally by the reference numeral 30 and includes an electric motor 32 connected through a gearbox 34 to the pinion gear of the steering mechanism 12, and a controller 36 for energizing the motor 32 during steering maneuvers in order to provide steering torque for assisting the operator of the vehicle in overcoming road load forces generated by the frictional engagement of the vehicle wheels 16 and the road surface 38. A torque transducer 40 senses a steering torque applied by the operator of the vehicle to the steering wheel 22 and generates an electrical signal in accordance therewith on line 42. Line 42 is applied as an input to controller 36 which responds to the sensed steering torque by suitably connecting the vehicle battery 44 to motor 32 via line 46 for achieving the desired level of steering torque assist.

The torque transducer 40 may be any conventional torque transducer, such as a strain gauge or a resistive or variable reluctance mechanism responsive to the twisting of a torsion bar (not shown) in the steering column 20. In any event, the transducer output signal is variable in magnitude from a lower limit value representative of a large operator exerted steering torque in the left hand direction through a mean value representative of no operator exerted steering torque to an upper limit value representative of a large operator exerted steering torque in the right hand direction. Circuitry for producing an output signal of the above nature is considered to be conventional and has been omitted herein for the purpose of simplicity.

Figure 2:
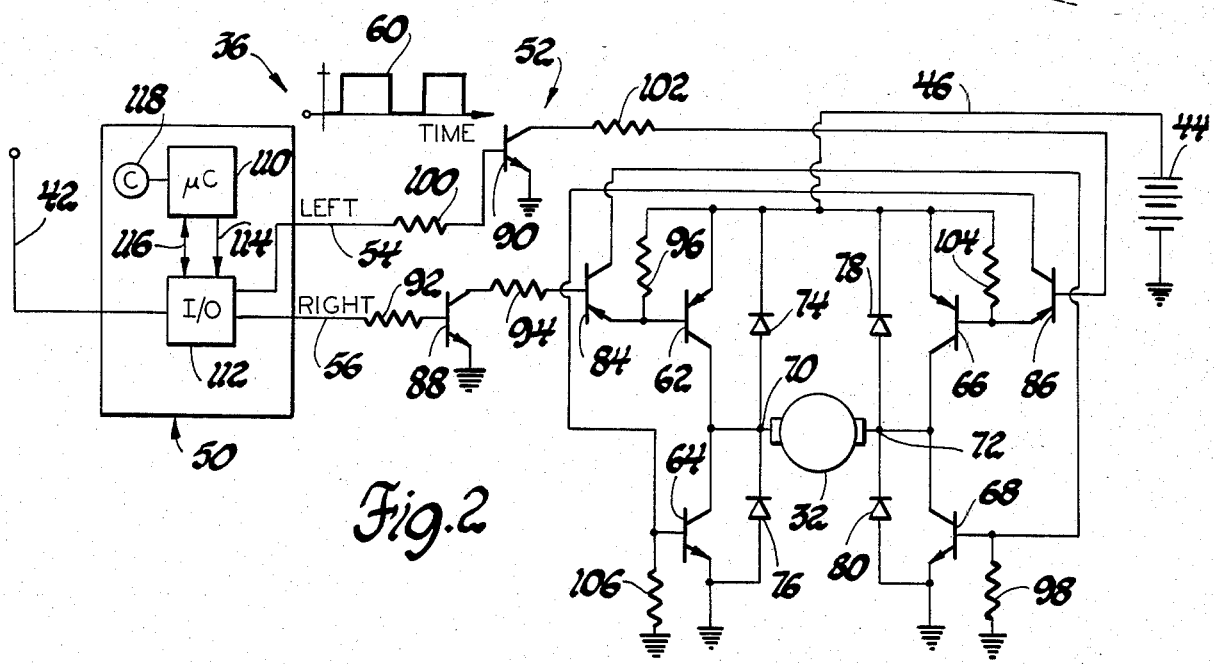
FIG. 2 is a partial circuit diagram of the controller depicted in FIG. 1 and a microcomputer based logic unit therefor.

FIG. 2 illustrates the controller 36 of FIG. 1 in detail. Also shown in FIG. 2 are electric motor 32 and vehicle battery 44. The controller 36 may be functionally divided into two parts: the microcomputer-based logic unit 50 and a motor driver circuit 52. As shown in FIG. 1, the power for the motor driver circuit 52 is derived from vehicle battery 44 via line 46.

The microcomputer-based logic unit 50 is responsive to the torque transducer output signal on line 42 for developing a pulse-width-modulated control signal on either left output line 54 or right output line 56 to control energization of motor 32. As noted above, the steering torque assist is developed by the electric power steering system in relation to the difference between a zero torque reference and the value of the transducer output signal. The sign of the difference indicates whether the operator is exerting a left hand or right hand steering torque and the magnitude of the difference indicates the amount of the torque. If the operator applies counterclockwise torque on steering wheel 22 to effect a left hand turning maneuver, the difference is negative and the microcomputer-based logic unit 50 develops a pulse-width-modulated signal such as designated by the reference numeral 60 on left output line 54. If the operator applies clockwise torque on steering wheel 22 to effect a right hand steering maneuver, the microcomputer-based logic unit 50 develops a similar pulse-width-modulated signal on right output line 56. In either case, the width of the pulses developed on lines 54 or 56 are varied indirect relation to the magnitude of the difference between the zero torque reference and the transducer output signal.

In the illustrated embodiment, the electric motor 32 is depicted as a DC motor and the motor drive circuitry 52 is in the form of what is commonly referred to in the electronic art as an "H" switch. Essentially, the "H" switch comprises four power transistors 62, 64, 66 and 68 connecting the motor 32 at its terminals 70 and 72 across vehicle battery 44 such that diagonally opposed transistors may be selectively and concurrently energized to control the direction of motor current and hence the direction of motor rotation. For example, a motor current from terminal 70 to terminal 72 may be effected by biasing power transistors 62 and 68 to their conductive states, and a motor current from terminal 72 to terminal 70 may be effected by biasing power transistors 66 and 64 to their conductive states. One direction of energization produces a steering torque assist in the right hand direction while the other direction of energization produces a steering torque assist in the left hand direction. As will become apparent, the left output line 54 and the right output line 56 of the microcomputer-based logic unit 50 are connected to the "H" switch for controlling the energization of motor 32 such that the steering assist torque provided by motor 32 aids the torque supplied by the operator of the vehicle in steering the vehicle wheels 16. A diode 74, 76, 78, 80, is connected across the emitter-collector circuit of each of the "H" switch power transistors 62, 64, 66 and 68 to protect the respective transistor at turn-off by circulating the inductive energy stored in motor 32. Such diodes are commonly called freewheeling or flyback diodes.

Driver transistors 84 and 86 are connected to diagonally opposed "H" switch power transistors such that driver transistor 84 controls the conduction of power transistors 62 and 68, and driver transistor 86 controls the conduction of power transistors 66 and 64. In turn, driver transistors 88 and 90 control the conduction of driver transistors 84 and 86, respectively. The conduction of driver transistors 88 and 90 is controlled by the logic level on right and left output lines 56 and 54, respectively.

A brief description of the relation between the microcomputer-based logic unit 50 and the driver circuitry 52 will now be given. When the operator of the vehicle exerts clockwise torque on steering wheel 22, the torque transducer 40 develops an electrical signal on line 42 in accordance therewith and microcomputer-based logic unit 50 determines the difference between a zero torque reference and the magnitude of such output signal. Then, the microcomputer-based logic unit 50 develops a pulse-width-modulated control signal, such as depicted by the reference number 60 and applied such pulse-width-modulated signal to right output line 56. As noted above, the width of the pulses is developed in relation to the magnitude of the torque difference. During such time, the left output line 54 is maintained at a logic zero voltage potential. The pulse-width-modulated signal on right output line 56 is applied through resistor 92 to the base input of driver transistor 88 thereby controlling its conduction. When the pulse-width-modulated signal is at a logic 1 voltage potential, transistor 88 is biased to a conductive state. In such case, the base input of driver transistor 84 is lowered to nearly ground potential through resistor 94 and the collector-emitter circuit of transistor 88. Since resistor 96 maintains the emitter of driver transistor 84 at a relatively high voltage level, driver transistor 84 is also biased to a conductive state. Transistor 84 thereby completes a conduction path through battery 44 and the base emitter circuits of power transistors 62 and 68 which biases such transistors to a conductive state to energize motor 32 such that the motor current enters terminal 70 and exits terminal 72. The motor 32 and gearbox 34 are configured so that such energization produces a steering assist torque which aids the operator of the vehicle in effecting the right hand steering maneuver. Resistors 96 and 98 are connected to the base terminals of power transistors 62 and 68 and act to bias such transistors to their nonconductive states when driver transistor 84 is nonconductive.

When the pulse-width-modulated signal on right output line 56 is at a logic zero voltage potential, driver transistors 84 and 88 are biased to their nonconductive states which in turn biases power transistors 62 and 68 to their nonconductive states de-energizing motor 32. When motor 32 is so de-energized, freewheeling diodes 74 and 80 may conduct to circulate the inductive energy stored in motor 32 through battery 44.

In the manner described above, a right hand steering assist torque is provided by motor 32 so long as the microcomputer-based logic unit continues to produce a pulse-width-modulated signal on right output line 56. When the difference between the zero torque reference and the transducer output signal value is substantially zero, the microcomputer-based logic unit 50 ceases to develop pulse-width-modulated signals on right output line 56.

When the operator exerts counterclockwise torque on steering wheel 22, the difference between the zero torque reference and the torque transducer output signal is negative indicating a left hand steering maneuver, and the microcomputer-based logic unit 50 develops a pulse-width-modulated signal such as depicted by the reference numeral 60 on left output line 54. As noted above, the width of the pulses is developed in relation to the magnitude of the difference between the zero torque reference and the transducer output signal. During such operation, right output line 56 is maintained at a logic zero voltage potential to maintain driver transistor 88 nonconductive.

When the pulse-width-modulated signal on left output line 54 is at a logic 1 voltage potential, driver transistor 90 is biased to a conductive state through resistor 100. In such case, the base input of driver transistor 86 is lowered to nearly ground potential through resistor 102 and the collector-emitter circuit of driver transistor 90. Since resistor 104 maintains the emitter of transistor 86 at a relatively high voltage potential, driver transistor 86 is also biased to its conductive state. Driver transistor 86 thereby completes a conduction path through battery 44 and the base-emitter circuits of power transistors 64 and 66 which biases such transistors to their conductive states to energize motor 32 such that the motor current enters terminal 72 and exits terminal 70. Such energization produces a steering assist torque which aids the operator of the vehicle in effecting the left hand steering maneuver. The resistors 104 and 106 are connected to the base terminals of power transistors 66 and 64 and act to bias such transistors to their nonconductive states when driver transistor 86 is nonconductive.

When the pulse-width-modulated signal on left output line 54 is at a logic zero voltage potential, driver transistors 90 and 86 are biased to their nonconductive states which in turn biases power transistors 64 and 66 to their nonconductive states de-energizing motor 32. When motor 32 is so de-energized, freewheeling diodes 76 and 78 may conduct to circulate the inductive energy stored in motor 32 through battery 44.

In the manner described above, a left hand steering assist torque is provided by motor 32 so long as microcomputer-based logic unit 50 senses a difference between the zero torque reference and the transducer output signal value. When the difference is reduced substantially to zero, microcomputer-based logic unit 50 ceases to develop pulse-width-modulated signals on left output line 54 and the energization of motor 32 is terminated.

As indicated above, the present invention provides an adaptive control system responsive to the torque transducer output signal on line 42 for developing suitable control signals on lines 54 and 56 to control the operation of driver circuitry 52. If the zero torque reference is fixed and the pulses applied to left and right output lines 54 and 56 are developed in accordance with the difference between the zero torque reference and the transducer output signal, drift and other sources of error which affect the magnitude of the torque transducer output signal may be recognized as operator exerted steering torque and may result in the production of an unwanted energization of motor 32. As noted above, one solution to this problem is to define a dead zone about the zero torque reference and to inhibit the development of steering torque assist when the transducer output signal is within the dead zone. However, this solution degrades the response of the system in that no torque assist is provided for relatively small amounts of operator exerted torque. According to this invention, the dead zone is eliminated and transducer output signal variations due to drift and other like sources of error are adaptively compensated for by shifting the zero torque reference in a direction to reduce the difference between the zero torque reference and the transducer output signal. The shifting is performed according to a predetermined time response characteristic so that over a period of time shifting of the zero torque reference due to operator exerted steering torque tends to cancel out. As a result, the value of the zero torque reference more nearly corresponds to the actual value of the transducer output signal for which no steering torque is exerted by the operator of the vehicle. These and other control functions are performed by the microcomputer-based logic unit 50 depicted in FIG. 2.

As schematically depicted in that figure, the microcomputer-based logic unit essentially comprises a microcomputer ($\mu$C) 110, an Input/Output (I/O) device 112 which communicates with microcomputer 110 via an address and control bus 114 and a bi-directional data bus 116, and a high frequency clock (C) 118 for supplying microcomputer 110 with a high frequency pulse train for controlling the operational timing of the same. The microcomputer 110 is preferably of the type including internal random-access-memory, read-only-memory, analog-to-digital circuitry, timing circuitry and nonvolatile electrically-erasable-programmable-read-only-memory (EEPROM), one such device being the 72720 microcomputer manufactured by SEEQ Technology, Incorporated, San Jose, Calif. Input/Output device 112 includes circuitry for converting the analog torque transducer signal on line 42 to a digital signal and driver circuitry for developing a pulse-width-modulated signal on left output line 54 or right output line 56 for controlling the conduction of driver transistors 90 and 88 in response to control signals developed by microcomputer 110. The computer program stored in the read-only-memory of microcomputer 110 and executed by microcomputer 110 to perform the control functions of this invention is depicted in the form of a flow diagram in FIGS. 4 and 5.

Figure 3:
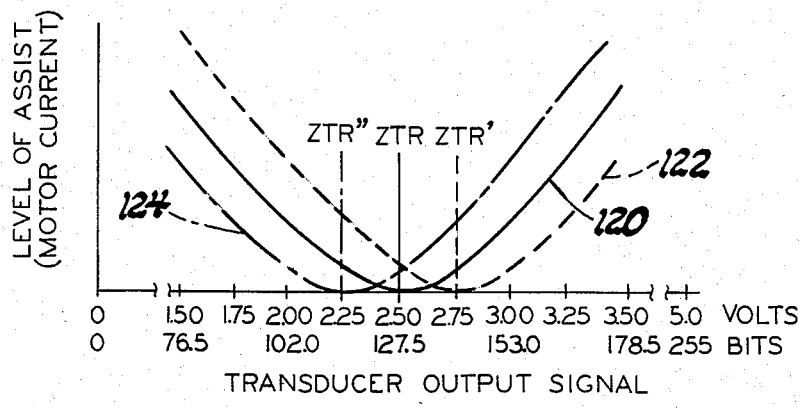
FIG. 3 is a graph depicting the level of torque assist as a function of the transducer output signal. The solid trace depicts operation when the zero torque reference has a value equal to the mean value of the transducer output signal; the two dashed traces depict operation when the zero torque reference has been shifted up and down according to this invention.

FIG. 3 graphically depicts the level of torque assist provided by motor 32 as a function of the transducer output signal voltage on line 42. The transducer output signal is variable in voltage magnitude according to the illustrated embodiment, from 0.00 volts to 5.00 volts. In carrying out the control functions of this invention, the analog-to-digital converter of microcomputer 110 develops a digital representation of the transducer output signal voltage, and such digital representation is also given in FIG. 3. A signal voltage of 0.00 volts represents a large operator exerted steering torque for effecting a left hand steering maneuver, a signal value of 2.50 volts represents no operator exerted steering torque, and a signal value of 5.00 represents a large operator exerted steering torque for effecting a right hand steering maneuver. The solid trace, designated by the reference numeral 120, depicts the relationship between the level of torque assist provided and the transducer output signal voltage when the zero torque reference is set at the mean value (2.50 volts) of the transducer output signal. In such case, and as above, the zero torque reference is designated by ZTR. The dashed trace 122, depicts the relationship between the level of torque assist provided and the transducer output signal voltage when the zero torque reference has been shifted to a value of 2.75 volts by the control system of this invention. In such case, the zero torque reference is designated by ZTR'. The dashed trace 124 depicts the relationship between the level of torque assist provided and the transducer output signal voltage when the zero torque reference has been shifted to value of 2.25 volts by the control system of this invention. In such case, the zero torque reference is designated by ZTR". In any case, the level of torque assist provided is determined in direct relation to the difference between the transducer output signal voltage and zero torque reference.

In some cases, the magnitude of the difference between the zero torque reference and the transducer output signal indicates whether the difference is due to operator exerted steering torque or to errors which affect the magnitude of the transducer output signal. Differences due to errors tend to be relatively small in magnitude, while differences due to operator exerted torque can be large or small. This invention takes advantage of the above phenomenon by inhibiting shifting of the zero torque reference if the difference between it and the transducer output signal is so great that it is likely attributable to operator exerted steering torque rather than to error. As will be described in reference to the flow diagrams in FIGS. 4 and 5, this feature is implemented according to this invention by defining a reference value RDIF which corresponds to a relatively large magnitude difference which is likely not due to errors which affect the transducer output signal value, and by comparing the actual difference therewith. It will be understood, of course, that the value of RDIF must be determined in relation to the magnitude of error expected for the particular torque transducer.

When the operator exerted steering torque is relatively low, the resulting difference between the zero torque reference and the transducer output signal is essentially indistinguishable from differences due to errors that affect the transducer signal value. As a result, the zero torque reference is shifted in response to the differences caused by operator exerted steering torque as well as the differences caused by error. Over the short term, shifting due to operator exerted steering torque may be significant depending upon the driving conditions encountered. To a certain extent, such shifting is beneficial in that the level of torque assist is greater than it otherwise would be when the direction of operator exerted steering torque is suddenly reversed. For example, if the zero torque reference is at 2.50 volts, and the operator suddenly exerts torque on steering wheel 22 in the clockwise direction to effect a right hand steering maneuver, the control system of this invention will increase the value of the zero torque reference toward the value of the resulting transducer output signal voltage, providing that the difference between the zero torque reference and the transducer output signal does not exceed the reference RDIF defined above. When the zero torque reference has been shifted in this manner to a value such as 2.75 volts, the relationship between the level of torque assist provided and the transducer output signal voltage is defined by the broken trace 122 instead of the solid trace 120. If the operator then suddenly reverses the torque exerted on steering wheel 22 to effect a left hand steering maneuver, the difference and hence the level of torque assist provided by motor 32 is higher than it otherwise would have been due to shifting of the zero torque reference. When such difference falls below the reference RDIF, the control system of this invention would begin shifting the zero torque reference in the opposite direction to decrease the difference between it and the transducer output signal thereby diminishing the increased amount of torque assist. If the operator exerted torque persists, the system of this invention would continue shifting the zero torque reference to a value such as 2.25 volts, and the relationship between the level of torque assist and the transducer output signal voltage would be given by the broken trace 124. If at such point the operator again reversed the direction of torque applied to steering wheel 22 to effect a right hand steering maneuver, the difference and hence the level of torque assist provided by motor 32 would again be higher than would otherwise occur without the shifting of the zero torque reference. As mentioned earlier, this effect is perceived as an advantage, particularly when the vehicle is being steered evasively to avoid an obstacle, in that the torque assist provided by the electric power steering system is enhanced when the direction of operator exerted steering torque is suddenly reversed. The effect is also advantageous in normal driving conditions in that the steering returnability is improved.

Unrestrained shifting of the zero torque reference due to operator exerted steering torque may produce undesirable results under driving conditions that require prolonged unidirectional steering effort such as might be encountered on an expressway cloverleaf. In an extreme case, the level of torque assist provided during the turning maneuver would be significantly reduced, and after the turning maneuver, the steering assist level would be higher in one direction than the other until the zero torque reference could be shifted back to the proper value. The undesirable results described above are avoided according to a further aspect of this invention by imposing limits on the amount by which the zero torque reference may be shifted from its initial value. As will later be explained, the limiting amount is determined in relation to the magnitude of transient error expected for the particular torque transducer. According to the illustrated embodiment, the authority range for shifting the zero torque reference is plus or minus 10% of the transducer output signal range. Thus, the maximum amount by which the zero torque reference may be shifted up or down from its initial value is 0.25 volts.

As indicated above, certain benefits are achieved in terms of steering response when the zero torque reference is shifted in response to differences caused by operator exerted steering torque. Over a period of vehicle operation, the operator exerts steering torque both in the left hand direction and the right hand direction, and shifting of the zero torque reference due to such operator exerted steering torque tends to cancel out. The remaining or net shifting of the zero torque reference thereby tends to compensate the zero torque reference value for errors which affect the magnitude of the transducer output signal.

Errors which affect the transducer output signal voltage tend to be either transient or steady state in nature. The transient errors may change significantly over a period of vehicle operation while the steady state errors remain generally unchanged from one period of operation to the next. Transducer drift, for example, is primarily temperature related and therefore is viewed as a transient error; transducer misalignment and wear are, for the most part, unaffected by the vehicle operating conditions and are therefore viewed as steady state errors.

According to this invention, both steady state and transient errors are compensated for by adjusting the value of the zero torque reference. The transient errors are compensated for by shifting the zero torque reference according to a predetermined time response characteristic during vehicle operation as described above. The predetermined time response characteristic has a time constant determined in relation to the expected time constant of the transient errors. The steady state errors, on the other hand, are compensated for by developing a steady state error term (SSET) during vehicle operation with a relatively long time constant integration technique and by storing the steady state error term in nonvolatile memory for future use. At the initiation of the next period of vehicle operation, the stored steady state error term is used to initialize the value of the zero torque reference. In this way, the steady state error term which is "learned" by the control system of this invention over a period of vehicle operation is retained and need not be "relearned" in subsequent periods of vehicle operation. In the subsequent period of vehicle operation, a new initial zero torque reference value is established and the zero torque reference may be varied therefrom during such period of vehicle operation in the manner described above. As a result, the maximum amount by which the zero torque reference may be shifted from the mean value of 2.50 volts is extended in the amount necessary to compensate for steady state errors.

Figure 4:
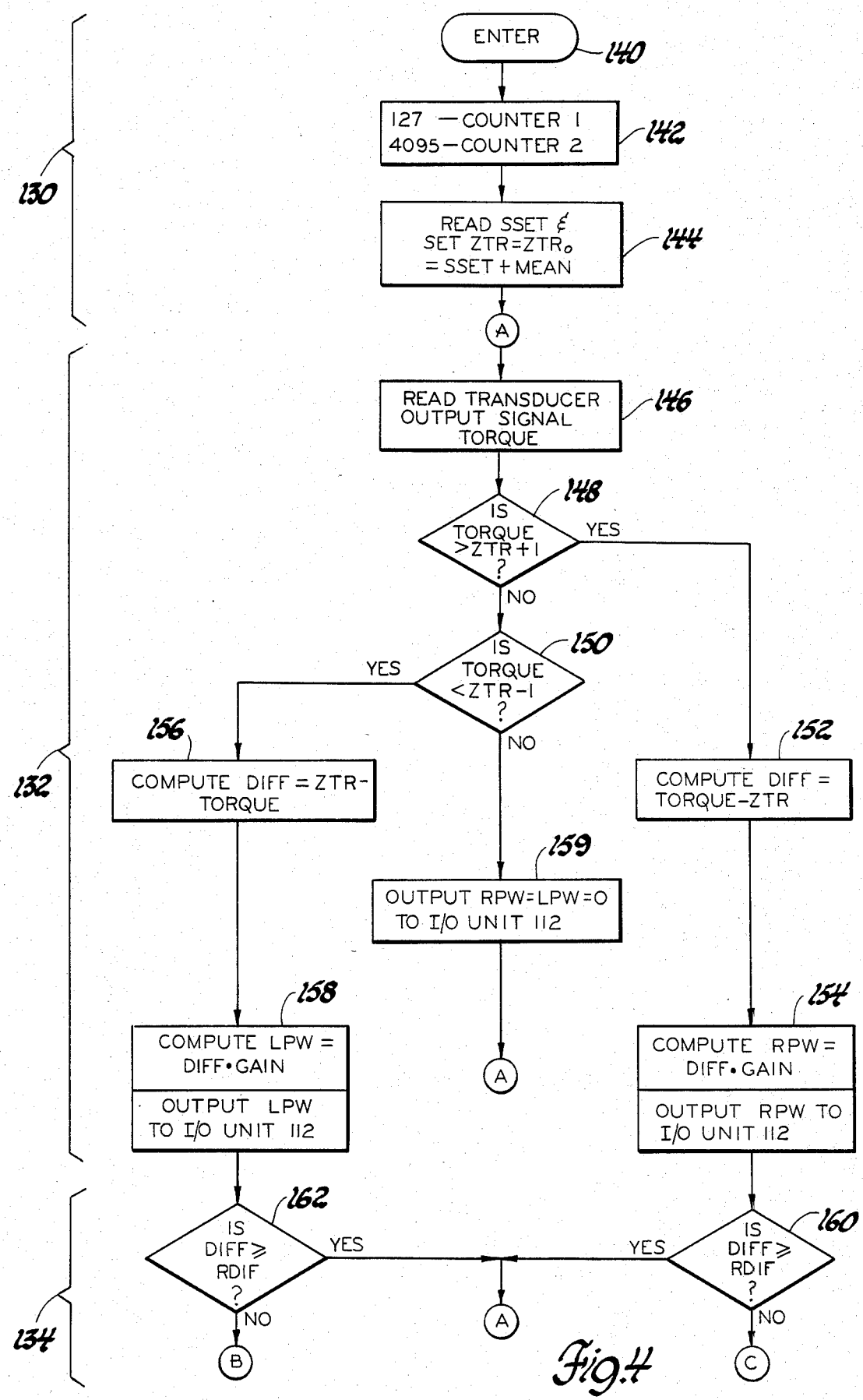
FIGS. 4 and 5 are flow diagrams for implementing the control functions of this invention with the microcomputer-based logic unit depicted in FIG. 2 herein.
Figure 5:
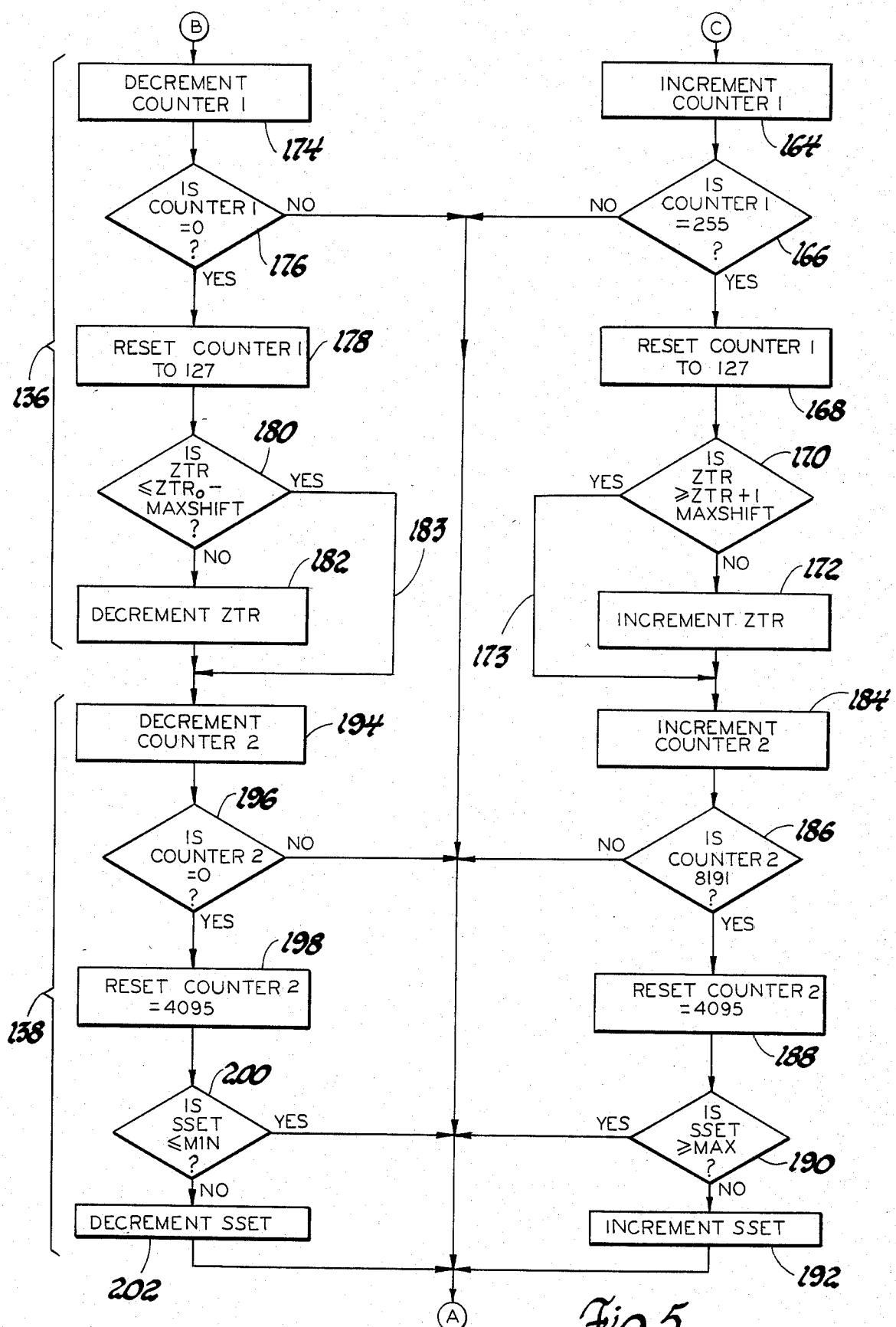

Referring now more particularly to FIGS. 4 and 5, the flow diagram representing the program instructions to be executed by microcomputer 110 for implementing the control functions of this invention will be described. FIGS. 4 and 5 together form a single flow diagram as indicated by the circled letter numerals A–C. For ease of description, the flow diagram is functionally divided into five sections as designated by the reference numerals 130–138. Reference numeral 130 designates a series of instructions executed at the initiation of vehicle operation for initializing the various registers and counters. Reference numeral 132 designates a series of instructions for reading the torque sensor output signal, for computing the difference between the torque signal and the zero torque reference, and for developing and outputting a suitable signal to motor driven circuit 52. Reference numeral 134 designates instructions for determining if the difference between the zero torque reference and the torque transducer signal is greater than a reference difference (RDIF) not likely attributable to drift or other like source of error. Reference numeral 136 designates a series of instructions for altering the zero torque reference according to a predetermined time response characteristic in a direction to reduce the difference between the zero torque reference and the transducer output signal. Reference numeral 138 designates a series of program instructions for altering the steady state error term according to a further predetermined time response characteristic.

Referring now to the flow diagram portion designated by the reference numeral 130, instruction block 140 designates the point at which the flow diagram is entered when vehicle operation is initiated. As will be understood by those skilled in the art, the instruction block 140 may also include various instructions for initializing the registers and memory locations within microcomputer 110 and Input/Output unit 112 to ensure repeatable performance at the initiation of vehicle operation. As indicated by instruction block 142, COUNTER 1 and COUNTER 2 are reset to digital values of 127 and 4095, respectively. COUNTER 1 takes the form of an 8-bit binary register and COUNTER 2 takes the form of a 13-bit binary register. As such, the digital number 127 represents the midpoint or mean value of COUNTER 1, and the digital number 4095 represents the midpoint or mean value of COUNTER 2. As indicated at instruction block 144, the steady state error term (SSET) is read from the EEPROM within microcomputer 110 and the initial zero torque reference ($ZTR_0$) is set equal to the sum of the steady state error term (SSET) and the mean torque transducer output value (MEAN). Thus, the steady state error term (SSET) is used as a stored correction amount for initializing the zero torque reference to reflect steady state error. Formation of the steady state error term (SSET) is discussed below in reference to the flow diagram portion designated by the reference numeral 138.

Referring now to the flow diagram portion designated by the reference numeral 132, a digital representation of the torque transducer output signal (TORQUE) is read as indicated by the instruction block 146. Decision blocks 148 and 150 define a very small dead band about the zero torque reference value and determine if assist is required, and if so, the direction of the assist. In contrast to conventional motor control systems wherein the dead band occupies a substantial portion of the transducer output signal range, the dead band defined by decision blocks 148 and 150 is very small (1 bit in 256) and is included to prevent noise or bit-jitter from producing torque assist. Decision block 148 determines if the torque value is greater than the zero torque reference plus 1 bit (ZTR+1). If so, right hand torque assist is indicated and instruction blocks 152 and 154 are executed to compute the difference (DIFF) between the torque value and the zero torque reference, to compute the right motor pulse width RPW as a function of DIFF and a gain term GAIN, and to output the right pulse width RPW to I/O unit 112 for application to motor driver circuit 52 via right output line 56. If the torque value is less than or equal to (ZTR+1), decision block 150 is executed to determine if the torque value is less than the zero torque reference minus 1 bit (ZTR−1). If so, left hand torque assist is indicated and instruction blocks 156 and 158 are executed to compute the difference DIFF between the zero torque reference and the torque value, to compute the left motor pulse width LPW as a function of DIFF and a gain term GAIN, and to output the left pulse width LPW to I/O unit 112 for application to motor driver circuit 52 via left output line 54. If decision block 150 is answered in the negative, the torque value is within 1 bit of the zero torque reference and instruction block 159 is executed to output a zero pulse width to I/O unit 112 for maintaining motor 32 de-energized, whereupon program execution is returned to the point designated by the circled letter A in flow diagram portion 132.

The flow diagram portion designated by the reference numeral 134 comprises decision blocks 160 and 162 for comparing the difference DIFF computed in flow diagram portion 132 to a reference difference RDIF which corresponds to a relatively large value of DIFF which would not likely be attributable to torque sensor drift or other like sources of error. If the computed difference DIFF is greater than or equal to the reference difference RDIF, program execution is directed to the point designated by circled letter A in flow diagram portion 132. If right hand torque assist is indicated, and the difference DIFF is less than the reference difference RDIF, program execution is directed to the point designated by the circled letter C in the flow diagram portion 136. If left hand torque assist is indicated and the difference DIFF is less than the reference difference RDIF, program execution is directed to the point designated by the circled letter B in flow diagram portion 136. Thus, the zero torque reference (ZTR) and the steady state error term (SSET) cannot be modified if the difference DIFF between the zero torque reference and the torque value is at least as large as the reference difference RDIF. Such reference difference is large enough to be distinguished from difference values which might be caused by torque transducer drift or other like sources of error. As mentioned above, the value of the reference difference RDIF should be determined in relation to the highest expected amount of torque transducer output signal deviation due to such errors.

In the flow diagram portion designated by the reference numeral 136, the register referred to as COUNTER 1 is used to establish a predetermined time response characteristic for shifting the zero torque reference (ZTR). As indicated above, COUNTER 1 is reset to its midpoint or mean digital value of 127 at the initiation of vehicle operation. If right hand torque assist is indicated, instruction block 164 is executed to increment the COUNTER 1 and decision block 166 is executed to determine if the COUNTER 1 has been incremented to its maximum digital value of 255. If so, instruction block 168 is executed to reset COUNTER 1 to the midpoint or mean value of 127. Decision block 170 then determines if the zero torque reference has been shifted beyond the range of shifting authority. The variable MAXSHIFT represents the maximum allowable shifting amount. Hence, the zero torque reference (ZTR) is compared to the sum of the initial zero torque reference ($ZTR_0$) and MAXSHIFT. If the zero torque reference is less than the sum, it is within the range of shifting authority and instruction block 172 is executed to increment the zero torque reference. Thus, the zero torque reference cannot be incremented until COUNTER 1 has been incremented to 255 and then only if the zero torque reference is greater than ($ZTR_0$+MAXSHIFT). If the zero torque reference is greater than or equal to ($ZTR_0$+MAXSHIFT), execution of instruction block 172 is skipped, as indicated by flow diagram line 173.

If left hand torque assist is indicated, the flow diagram instructions designated by the reference numerals 174–183 are executed. Such instructions are analogous to the flow diagram instructions 164–173 described in reference to right hand steering assist, but act in the opposite direction. Thus, instruction block 174 decrements COUNTER 1 and instruction block 176 determines if COUNTER 1 has been decremented to its minimum digital value of 0. If so, instruction block 178 is executed to reset COUNTER 1 to its midpoint or mean digital value of 127, and decision block 180 is executed to determine if the zero torque reference (ZTR) is within the shifting authority range. Thus, ZTR is compared to the difference between the initial zero torque reference $ZTR_0$ and the variable MAXSHIFT. If ZTR is greater than ($ZTR_0$−MAXSHIFT), the zero torque reference is within the shifting authority range and instruction block 182 is executed to decrement the zero torque reference. Thus, the zero torque reference cannot be decremented until COUNTER 1 has been decremented to zero and then only if the zero torque reference is greater than ($ZTR_0$−MAXSHIFT). If the zero torque reference is less than or equal to (ZTR$_0$—MAXSHIFT), execution of instruction block 182 is skipped as indicated by flow diagram line 183.

As the vehicle is operated, both right hand and left hand steering assist are called for, and the digital number in COUNTER 1 provides an indication of the relative amounts of each. An imbalance of right hand assist either due to operator exerted steering torque or error, causes COUNTER 1 to be incremented more than decremented. When the number in COUNTER 1 reaches 255, COUNTER 1 is reset and the zero torque reference is incremented to reduce the difference between it and the transducer output signal. Similarly, an imbalance of left hand assist either due to operator exerted steering torque or error, causes COUNTER 1 to be decremented more than incremented. When the number in COUNTER 1 reaches zero, COUNTER 1 is reset and the zero torque reference is decremented to reduce the difference between it and the transducer output signal. This sequence of steps establishes a predetermined time response characteristic for altering the zero torque reference, the time constant of such response characteristic being determined by the size of COUNTER 1 and by the time required to execute the various flow diagram instructions. In a working embodiment, based essentially on the flow diagram depicted in FIGS. 4 and 5, COUNTER 1 provided a time constant of approximately 1/10th second, meaning for example, that a 1/10th second duration of continuous right hand steering assist increments COUNTER 1 to its maximum value of 255.

As noted above, the term MAXSHIFT determines the maximum allowable amount by which the zero torque reference may be shifted during a period of vehicle operation. Since such shifting is intended to compensate the zero torque reference for transient or temperature dependent errors, such as drift, the value of the term MAXSHIFT should be determined in relation to the highest expected transducer output signal deviation due to such errors. According to the illustrated embodiment, the term MAXSHIFT is set at 10% of the transducer output signal range. Thus, the zero torque reference may be shifted up or down from the initial zero torque reference (ZTR$_0$) by a maximum amount of 0.25 volts.

In the flow diagram portion designated by the reference numeral 138, the register or memory location designated as COUNTER 2 is incremented and decremented in accordance with the steering assist to control the incrementing and decrementing of the steady state error term SSET. At the initiation of vehicle operation, instruction block 142 is executed to reset COUNTER 2 to its midpoint or mean value of 4095. If right hand steering assist is indicated, instruction block 184 is executed to increment COUNTER 2 and decision block 186 is executed to determine if COUNTER 2 has been incremented to its maximum digital value of 8191. If not, execution is directed to the flow diagram point designated by the circled letter A in flow diagram portion 132. If so, instruction block 188 is executed to reset COUNTER 2 at the midpoint value of 4095 and decision block 190 is executed to determine if the stored steady state error term SSET is greater than or equal to its maximum allowable value, designated by the term MAX. If so, further execution is directed to the point designated by the circled letter A; if not, instruction block 192 is executed to increment the steady state error term SSET.

If, on the other hand, left hand steering assist is indicated, instruction block 194 is executed to decrement the value of COUNTER 2 and decision 196 is executed to determine if COUNTER 2 has been decremented to a digital value of zero. If not, further execution is directed to the flow diagram point designated by the circled numeral A; if so, instruction block 198 is executed to reset COUNTER 2 to the midpoint value of 4095 and decision block 200 is executed to determine if the steady state error term SSET is less than or equal to its minimum allowable value, designated by the term MIN. If so, further execution is directed to the flow diagram point designated by the circled letter A; if not, instruction block 202 is executed to decrement the value of the steady state error term SSET.

In view of the above, it will be understood that COUNTER 2 is decremented or incremented each time the zero torque reference is decremented or incremented, respectively. When COUNTER 2 has been decremented to its minimum value of zero, or incremented to its maximum value of 8191, it is reset to its midpoint value and the steady state error term SSET is decremented or incremented. COUNTER 2 thus defines a second or further predetermined time response characteristic that is significantly slower than that defined by COUNTER 1. In the illustrated embodiment, the time constant of such response characteristic is approximately 7 minutes. As a result, the steady state error term SSET reflects only long time constant or steady state errors which affect the magnitude of the torque transducer output signal. The value of SSET is stored in the EEPROM of microcomputer 110 and used to determine the initial zero torque reference value (ZTR$_0$) in the subsequent period of vehicle operation, as set forth at instruction block 144. In this way, the zero torque reference shifting which is attributable to steady state sources of error, such as torque transducer misalignment, is stored during periods of vehicle inoperation and need not be "relearned" in the subsequent period of vehicle operation. Thus, the steady state error term SSET is updated over the life of the vehicle and continuously reflects the amount of steady state error.

Although this invention has been described in reference to a specific embodiment, it will be understood that various modifications thereto may occur to those skilled in the art and that such modifications may also fall within the scope of this invention, which is defined by the appended claims.

The embodiments of the invention in which an exclusive property or privilege is claimed are defined as follows:

1. In a motor vehicle electric power steering system including a torque transducer responsive to steering torque exerted by the operator of the vehicle for generating an electrical output signal variable in magnitude from a lower limit value representative of a large operator exerted steering torque in one direction through a mean value representative of no operator exerted steering torque to an upper limit value representative of a large operator exerted steering torque in the opposite direction, an electric motor energizable to produce a steering assist torque, and a motor controller for variably energizing such motor to produce steering assist torque in direct relation to a control signal applied thereto, a method of operation, comprising the steps of:

generating a zero torque reference having an initial value which corresponds to the mean value of the torque transducer output signal;

developing a control signal for said motor controller according to the magnitude of the difference between the zero torque reference and the transducer output signal, such difference being attributable to operator exerted steering torque, to sources of error which affect the magnitude of the transducer output signal, or to both; and shifting the zero torque reference in a direction to reduce the difference between it and the transducer output signal in accordance with a predetermined time response characteristic so that over a period of time shifting of the zero torque reference due to operator exerted steering torque tends to cancel out and the remaining net shift tends to adaptively compensate the zero torque reference for sources of error which affect the magnitude of the transducer output signal thereby to cause the value of the zero torque reference to more nearly correspond to the actual value of the transducer output signal for which no steering torque is exerted by the operator of the vehicle.

2. A method of operation as set forth in claim 1, including the steps of:

defining a reference difference determined in relation to the highest amount of transducer output signal error which can be expected to occur in a period of vehicle operation;

comparing the reference difference to the actual difference between the zero torque reference and the transducer output signal; and inhibiting shifting of the zero torque reference if the actual difference exceeds the reference difference to thereby avoid shifting of the zero torque reference when the difference between it and the transducer output signal is likely attributable to operator exerted steering torque rather than to the sources of transducer output signal error.

3. A method of operation as set forth in claim 1 including the steps of:

defining a shifting authority range about the initial value of the zero torque reference, the limits of such range being determined in relation to the highest amount of transducer output signal error which can be expected to occur in a period of vehicle operation; and inhibiting shifting of the zero torque reference if such shifting would otherwise cause the zero torque reference to fall outside said shifting authority range, whereby prolonged unidirectional operator exerted steering torque is ineffective to shift the zero torque reference beyond the amount required to compensate for the highest expected amount of transducer output signal error.

4. In a motor vehicle electric power steering system including an electric motor energizable to produce steering assist torque, a motor controller for variably energizing said motor to produce steering assist torque in direct relation to a control signal applied thereto, and a torque transducer responsive to steering torque exerted by the operator of the vehicle for generating an output signal variable in magnitude from a lower limit value representative of a large operator exerted steering torque in one direction through a mean value representative of no operator exerted steering torque to an upper limit value representative of a large operator exerted steering torque in the opposite direction, the magnitude of such transducer output signal being affected by transient errors which vary over a period of vehicle operation and by steady state errors which vary over the life of the vehicle, a method of operation which compensates the response of the system for such transient and steady state errors, such method comprising the steps of:

generating a zero torque reference at the initiation of each period of vehicle operation, such reference being initialized at a value determined as a combined function of the torque transducer mean output signal value and a previously stored steady state error term;

developing a control signal for said motor controller according to the difference between the zero torque reference and the transducer output signal; and shifting the zero torque reference in a direction to reduce the difference between it and the transducer output signal in accordance with a predetermined time response characteristic such that over a period of time shifting of the zero torque reference due to operator exerted steering torque tends to cancel out and the remaining net shift tends to adaptively compensate the zero torque reference for the transient errors as they vary over the period of vehicle operation.

5. A method of operation as set forth in claim 4, including the steps of:

defining a reference difference determined in relation to the highest amount of transient error which can be expected to occur in a period of vehicle operation;

comparing the reference difference to the actual difference between the zero torque reference and the transducer output signal; and inhibiting shifting of the zero torque reference if the actual difference exceeds the reference difference to thereby avoid shifting of the zero torque reference when the difference between it and the transducer output signal is likely attributable to operator exerted steering torque rather than to the transient error.

6. A method of operation as set forth in claim 4 including the steps of:

defining a shifting authority range about the initial value of the zero torque reference, the limits of such range being determined in relation to the highest amount of transient error which can be expected to occur in a period of vehicle operation; and inhibiting shifting of the zero torque reference if such shifting would otherwise cause the zero torque reference to fall outside said shifting authority range, whereby prolonged unidirectional operator exerted steering torque is ineffective to shift the zero torque reference beyond the amount required to compensate for the highest expected amount of transient error.

7. A method of operation as set forth in claim 4, including the steps of:

updating said steady state error term in accordance with a measure of the steady state error determined during such period of vehicle operation whereby in the following period of vehicle operation, the zero torque reference is initialized to a value which compensates the response of the system for the measured steady state error.

8. A method of operation as set forth in claim 7, wherein the updating of the steady state error term comprises the steps of:

maintaining an indication of the net shifting of the zero torque reference in the course of a period of vehicle operation;

modifying the previously stored steady state error term in a direction to increase the initial value of the zero torque reference in the following period of vehicle operation if the net shifting indication rises to an upper reference value representative of the presence of steady state error which tends to increase the transducer output signal value, and in a direction to decrease the initial value of the zero torque reference in such following period of vehicle operation if the net shifting indication falls to a lower reference value representative of the presence of steady state error which tends to decrease the transducer output signal value.

9. A method of operation as set forth in claim 8, including the step of:

inhibiting further modification of the steady state error term if such modification would otherwise cause the steady state error term value to exceed the highest amount of steady state error which can be expected to occur over the life of the vehicle.

* * * * *